US008863986B2

(12) United States Patent
Randall, Jr. et al.

(10) Patent No.: US 8,863,986 B2
(45) Date of Patent: Oct. 21, 2014

(54) TIME VOLUMETRIC FLUID DISPENSING APPARATUS

(75) Inventors: John R. Randall, Jr., Freehold, NJ (US); Denis E. Keyes, Sarasota, FL (US)

(73) Assignee: Acertacorp LLC, Sarasota, FL (US)

(*) Notice: Subject to any disclaimer, the term of this patent is extended or adjusted under 35 U.S.C. 154(b) by 539 days.

(21) Appl. No.: 13/043,898

(22) Filed: Mar. 9, 2011

(65) Prior Publication Data

US 2012/0228325 A1 Sep. 13, 2012

(51) Int. Cl.
| B67D 1/00 | (2006.01) |
| B67B 7/00 | (2006.01) |
| E03B 7/07 | (2006.01) |
| G01F 13/00 | (2006.01) |
| B65B 57/14 | (2006.01) |
| B65B 3/34 | (2006.01) |
| G01F 11/28 | (2006.01) |

(52) U.S. Cl.
CPC ............ *B67D 1/0012* (2013.01); *G01F 13/006* (2013.01); *B67D 1/0011* (2013.01); *B65B 57/145* (2013.01); *B65B 3/34* (2013.01); *G01F 11/284* (2013.01)
USPC .................. 222/64; 222/1; 222/318; 137/563; 137/558

(58) Field of Classification Search
USPC .............. 222/64, 67, 386.5, 212, 215, 1, 318; 141/198; 137/563, 139, 558, 396
See application file for complete search history.

(56) References Cited

U.S. PATENT DOCUMENTS

| 5,480,063 | A | 1/1996 | Keyes et al. | |
| 5,680,960 | A | 10/1997 | Keyes et al. | |
| 6,024,251 | A | 2/2000 | Mayer et al. | |
| 7,104,422 | B2 * | 9/2006 | DiLeo | 222/64 |
| 7,753,232 | B2 | 7/2010 | Keyes et al. | |
| 8,444,015 | B2 * | 5/2013 | Keyes et al. | 222/64 |
| 2004/0164092 | A1 * | 8/2004 | DiLeo | 222/64 |
| 2004/0256409 | A1 | 12/2004 | Proulx | |

FOREIGN PATENT DOCUMENTS

| DE | 19640664 C1 | 2/1998 |
| EP | 0745832 A1 | 12/1996 |
| EP | 0863385 A1 | 9/1998 |

* cited by examiner

*Primary Examiner* — Kevin P Shaver
*Assistant Examiner* — Stephanie E Williams
(74) *Attorney, Agent, or Firm* — Coats & Bennett, PLLC (57) ABSTRACT

A dispensing apparatus for dispensing predetermined volumes of fluid into receptacles receives the fluid to be dispensed from a fluid supply into a reservoir. A fill tube is connected to the fluid reservoir such that it forms a closed loop with the reservoir. The fill tube minimizes the fluid turbulence that occurs inside the reservoir while the reservoir is being re-supplied with fluid from the fluid source. Additionally, the fill tube holds the predetermined volume of fluid to be dispensed into the receptacle. A fluid level sensor is disposed along the fill tube to control the volume of fluid flowing into or out of the fill tube, while a timer controls a dispense valve to meter the flow of fluid into or out of a dispense tube.

17 Claims, 11 Drawing Sheets

TIME VOLUMETRIC FLUID DISPENSING APPARATUS

FIELD OF THE INVENTION

The present invention relates generally to fluid dispensing devices, and particularly to time volumetric fluid dispensing devices for dispensing a predetermined volume of fluid.

BACKGROUND

There are many types of fluid dispensing devices currently available. For example, one type of fluid dispensing device that is currently in widespread use is known as a positive displacement filler. Some positive displacement fillers employ a piston and cylinder arrangement to alternately draw and expel a fluid to be dispensed. The piston draws the fluid into the cylinder when it moves in one direction (e.g., a downward stroke), and expels the fluid from the cylinder when it moves in an opposite direction (e.g., an upward stroke). The expelled fluid enters the bottle or container through a tube connected to the cylinder. Other types of positive displacement fillers may employ rotary pumps or diaphragm pumps to alternately draw and expel the fluid.

Another type of fluid dispensing device is known as a time/pressure filler. Generally, the time/pressure filler includes a fluid reservoir which is maintained under a relatively constant pressure. The fluid is dispensed from the reservoir through a compressible tube. Fluid flow is shut off by a pinch type valve which squeezes and collapses the discharge line. A pre-determined volume of fluid is dispensed by opening the discharge line for a pre-determined period of time and then closing the line. If the pressure within the fluid reservoir is maintained at a constant level, an equal amount of fluid should be dispensed each time the cycle is repeated.

A third type of fluid dispensing device is known as a volumetric fluid dispensing device. These types of devices first measure a predetermined volume of fluid before dispensing the fluid into a bottle or container. Generally, a fill tube is disposed between the reservoir and the bottle that receives the predetermined volume of fluid to be dispensed. The fill tube may comprise a compressible tube with a pinch-type valve. When the fill tube fills to a specified level, which may be determined by one or more optical sensors, for example, the pinch-type valve opens to permit the measured fluid to flow through the fill tube and into the bottle or container. Once the fluid is dispensed, the valve closes to stop the flow of fluid until the fill tube once again holds the predetermined volume of fluid.

Another type of volumetric fluid dispensing device uses the net weight of a container or bottle that receives the dispensed fluid. Particularly, the empty bottle or container rests on a balance. As the fluid enters the bottle or container, the balance detects the change in the bottle's weight. When the balance detects that the bottle and fluid have achieved a specified weight, a pinch-type valve closes to stop the flow of fluid into the bottle or container.

Some types of volumetric fluid dispensing devices do not employ pinch valves in the fluid path. With such devices, fluid is still measured and dispensed similar to a volumetric fluid dispensing device. However, rather than use a pinch valve to stop the flow of fluid, these types of devices raise and lower system components to control the fluid flow.

Each of these types of fluid dispensing devices has their advantages, such as speed and/or accuracy, but they also have various disadvantages.

SUMMARY

The present invention provides a dispensing apparatus for dispensing a predetermined volume of fluid into a receptacle such as a bottle. A fluid source supplies the fluid to be dispensed to a fluid reservoir having a fill tube. The fill tube is connected to the fluid reservoir such that it forms a closed loop with the reservoir. The fill tube serves to minimize fluid turbulence that may occur inside the reservoir while the reservoir is being re-supplied with fluid from the fluid source. The fill tube also functions to hold the fluid to be dispensed into the receptacle.

In one embodiment, the fill tube includes a fill valve and a fluid level sensor disposed at an upper section of the fill tube. A dispense valve is connected to the fill tube and is controlled by a timer. In operation, the fill valve opens to allow fluid from the fluid reservoir to flow into the fill tube. When the sensor detects the rising level of fluid in the fill tube, it generates a signal that causes the fill valve to close. The dispense valve is then opened to allow the fluid in the fill tube to flow into the receptacle.

The dispense valve is connected to a timer that allows the fluid to flow out of the fill tube for a predetermined time. Once the timer expires, the dispense valve is closed and the fill valve is once again opened to allow the fill tube to refill with fluid. The timer is set to a value such that when the timer expires and the dispense valve closes, the predetermined volume of fluid will have been dispensed into the bottle.

In another embodiment, the fluid level sensor is positioned along a lower part of the fill tube, and the timer controls the fill valve rather than the dispense valve. In this embodiment, the fill valve opens to allow the fluid to flow into the fill tube for a predetermined time. When the timer expires, the fill valve is closed and the fill tube is filled with the fluid. Once the fill valve is closed, the dispense valve is opened to allow a predetermined volume of fluid to flow from the fill tube and into the bottle. That is, when the fluid level sensor at the lower part of the fill tube detects the falling level of fluid in the fill tube, it generates a signal that causes the dispense valve to close. After closing the dispense valve, the fill valve is opened to allow the fluid from the reservoir to once again flow into the fill tube.

DETAILED DESCRIPTION

The present invention provides a dispensing apparatus for dispensing predetermined volumes of fluid into receptacles. In one embodiment, the apparatus comprises a fluid reservoir to hold a fluid to be dispensed and a fill tube. The fill tube forms a closed-loop with the fluid reservoir and holds the fluid to be dispensed into the receptacles. A fill valve is disposed on the fill tube and supplies fluid from the fluid reservoir to the fill tube during a fill stage. A dispense valve is also disposed on the fill tube and functions to dispense a predetermined volume of fluid from the fill tube into the fluid receptacle during a dispense stage.

The dispensing apparatus also comprises a fluid level sensor, a timer, and a controller communicatively connected to both the fluid level sensor and the timer. In operation, the dispensing apparatus is configured to measure a predetermined volume of fluid using either a time-based filling method, or a time-based dispensing method. With the time-based fill method, the controller operates the timer to measure a time for supplying the fluid from the fluid reservoir to the fill tube starting from a predetermined fluid level in the fill tube. Once filled, the apparatus uses the sensor to determine whether the predetermined volume of fluid has been dispensed. With the time-based dispensing method, the controller utilizes a sensor to determine when the fill tube has a sufficient amount of fluid, and then starts the timer to measure a time for discharging the fluid from the fill tube starting from the predetermined fluid level in the fill tube.

Figure 1A:
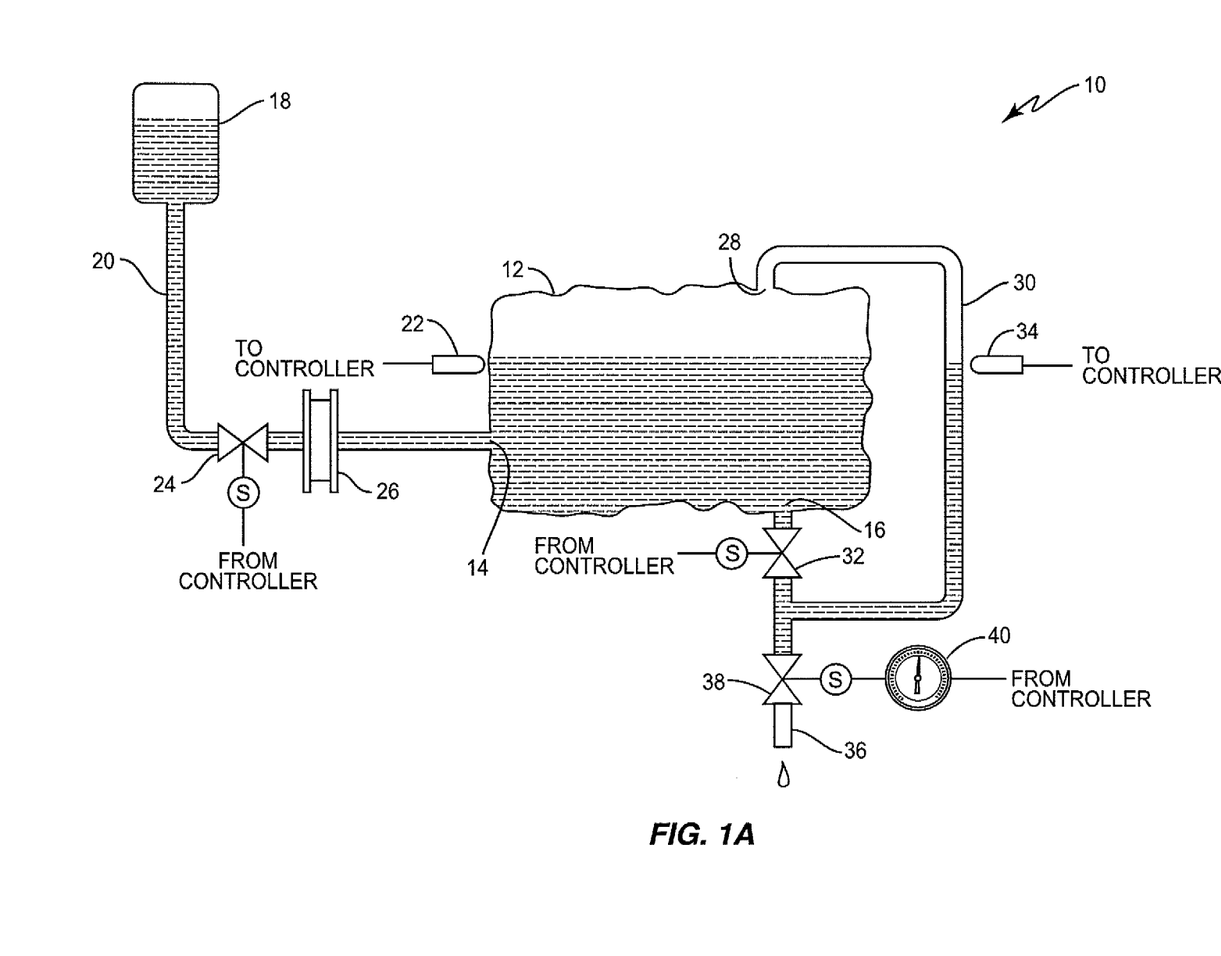
FIG. 1A is a block diagram illustrating a Time-Volumetric Fluid Dispensing Apparatus configured according to one embodiment of the present invention.

Turning to the drawings, FIG. 1A illustrates a time-volumetric dispensing device 10 configured to dispense a predetermined volume of fluid according to one embodiment of the present invention. With the present invention, all parts of the dispensing device 10 that come into contact with the fluid being dispensed remain clean, sterile, and disposable.

The fluid dispensing device 10 comprises a fluid reservoir 12 having an inlet 14 and an outlet 16. The inlet 14 is connected to a fluid source 18 that supplies the fluid to reservoir 12 via a supply conduit 20. The outlet 16 is connected to a fill tube 30. In general, fluid source 18 supplies the fluid to be dispensed to the fluid reservoir 12. In turn, the fluid reservoir 12 discharges fluid through the outlet 16 into the fill tube. As described later in more detail, the fill tube 30 holds fluid that is dispensed through a dispense tube 36 into one or more fluid receptacles, such as bottles or containers.

In this embodiment, fluid reservoir 12 comprises a flexible fluid reservoir that holds the supply of fluid to be dispensed. Because fluid reservoir 12 is flexible, it may expand as fluid is added from fluid source 18, and contract as fluid is discharged into the fill tube 30. Therefore, a sensor 22 may be disposed proximate fluid reservoir 12 to monitor and control the volume of fluid contained within fluid reservoir 12 such that it maintains a generally constant volume.

For example, in one embodiment, sensor 22 comprises an optical sensor that detects when the level of the fluid in fluid reservoir 12 falls below a predetermined level. When this occurs, the sensor 22 generates a signal to a programmable controller that, in turn, generates a control signal that causes fluid source 18 to supply additional fluid. Particularly, the controller is communicatively connected to a solenoid S and a supply valve 24 disposed along the supply conduit 20. The control signal causes the supply valve 24, which may be a pinch valve, for example, to open. With the supply valve 24 open, fluid from the fluid source 18 flows through a sterilization or clarification filter 26 and into the reservoir 12. When sensor 22 detects that the fluid level has returned to the predetermined level, sensor 22 generates another signal to the controller. In response, the controller generates another control signal to close the supply valve 24 to stop the flow of fluid from flowing into the reservoir 12.

The fill tube 30, as stated previously, is connected to the bottom part of reservoir 12 via outlet 16. The other end of the fill tube 30 is connected to a vent port 28 formed in an upper part of the reservoir 12. Thus, the fill tube 30 forms a closed loop with the fluid reservoir 12. Because the fill tube 30 forms a closed loop with reservoir 12, it eliminates the need to vent the reservoir 12 to the ambient atmosphere. It also tends to isolate the fluid in the fill tube 30 from the fluid in reservoir 12, and minimizes the turbulence that occurs while reservoir 12 is being re-supplied with fluid from the fluid source 18. This helps to accurately maintain the fluid inside fill tube 30 at the predetermined level.

The fill tube 30 holds the fluid to be dispensed into the receptacles. To control the flow of fluid into the fill tube 30 from reservoir 12, a fill valve 32 is disposed in the closed loop fill tube 30. The fill valve 32 is operatively connected to the controller via a solenoid S, and opens and closes according to control signals received from the controller. When open, the fill valve 32 allows fluid to enter the fill tube. When closed, the fill valve 32 prevents the fill tube 30 from being filled with fluid from reservoir 12.

A fluid level sensor 34 is disposed along the fill tube 30. The sensor 34, which may be an optical sensor, for example, may be positioned at any point desired along the fill tube 30; however, in this embodiment, the sensor 34 is located at an upper position along fill tube 30. In this position, the sensor 34 detects when the fluid in the fill tube 30 reaches a predetermined upper fill level.

A dispense tube 36 connects to the fill tube 30 via a dispense valve 38. A timer 40, which is connected to the programmable controller, helps to control the operations of the dispense valve 38. Particularly, the programmable controller utilizes the timer 40 to measure a time for discharging the fluid from the fill tube 30 starting from a predetermined fluid level in the fill tube 30. To accomplish this, the controller will start the timer 40 and generate a control signal when the fluid in the fill tube 30 is at the predetermined upper level to open the dispense valve 38 via a solenoid S. While open, fluid is allowed to flow from the fill tube 30 and into the bottles or containers via dispense tube 36; however, in this embodiment, the fluid will be dispensed only for a predetermined time. When the predetermined time period has elapsed, the timer 40 generates a signal to inform the controller that time has expired. In response, the controller generates a control signal to close the dispense valve 38, thereby ceasing the dispensing of the fluid into the bottles or containers.

Figure 1B:
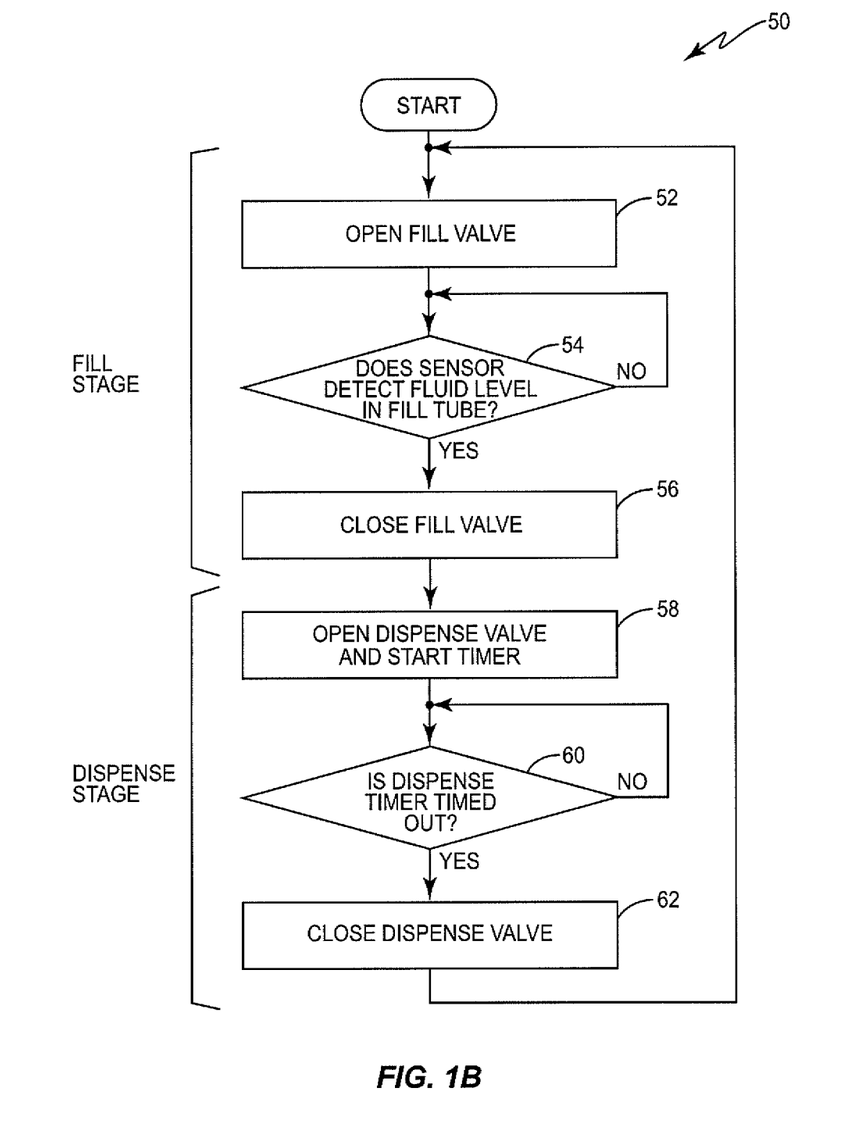
FIG. 1B is a flow chart illustrating a method by which a Time-Volumetric Fluid Dispensing Apparatus dispenses a predetermined volume of fluid according to one embodiment of the present invention.

FIG. 1B illustrates a method 50 showing how the programmable controller controls the filling and dispensing operations according to one embodiment of the present invention. As seen in FIG. 1B, the controller controls the operation of the device 10 in two stages—a fill stage in which the fill tube 30 is filled with the fluid, and a dispense stage in which the controller controls the operation of device 10 to dispense a predetermined volume of fluid into the bottles or containers.

Method 50 begins with the controller generating a control signal to open the fill valve 32 (box 52). During the fill stage, the dispense valve 38 is closed. This causes the fill tube 30 to fill with fluid supplied from reservoir 12. When the sensor 34 detects that the level of fluid in the fill tube 30 has reached a pre-defined upper level (box 54), the controller generates a control signal to close the fill valve 32 (box 56). This ends the fill stage and begins the dispense stage.

The fill valve 34 will remain closed throughout the dispense stage. The controller generates a control signal to open the dispense valve 38 and start the timer 40 (box 58). With the dispense valve 38 open, and only while the timer 40 is not expired, the fluid within the fill tube 30 flows into the bottles or containers. When the timer 40 expires, however (box 60), the controller will generate a control signal that closes the dispense valve 38 (box 62).

Figure 2:
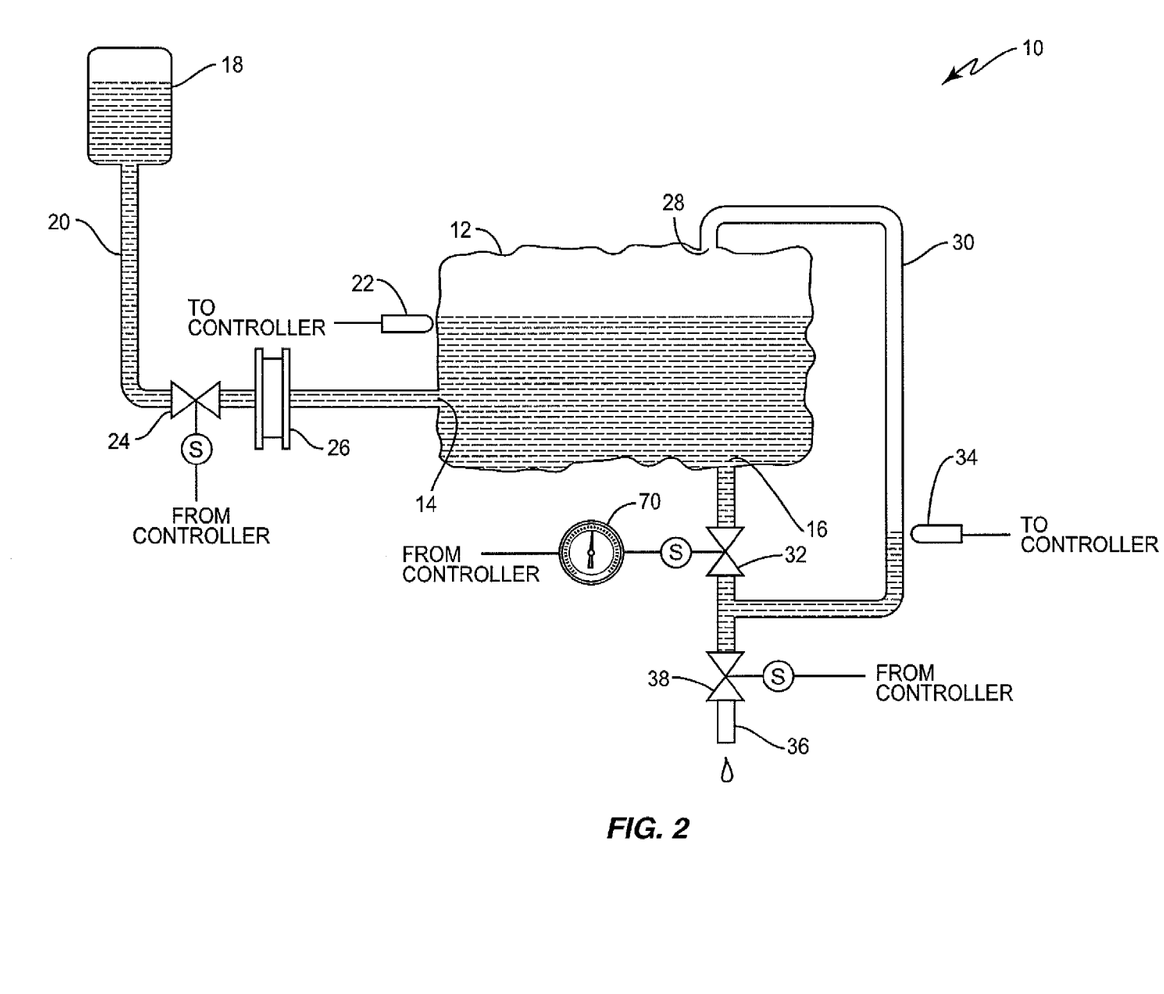
FIG. 2 is a block diagram illustrating a Time-Volumetric Fluid Dispensing Apparatus configured according to another embodiment of the present invention.

FIG. 2 illustrates device 10 configured to dispense a predetermined volume of fluid according to another embodiment of the present invention. In this embodiment, the sensor 34 is positioned at a lower portion of the fill tube 30, rather than along an upper portion. Additionally, the timer 40 from FIG. 1A has been removed and replaced by a timer 70. In this configuration, the timer 70 is utilized for measuring a time for supplying the fluid from the fluid reservoir 12 to the fill tube 30 starting from a predetermined fluid level in the fill tube. To accomplish this, the controller controls the fill valve 32 to open and close. Specifically, the controller generates signals to start the timer 70 and to open the fill valve 32. When opened, the fill valve 32 allows the fill tube 30 to fill with fluid, but only until the timer 70 expires. When the timer 70 expires, the fill tube 30 is filled with the fluid for dispensing into the bottles or containers. The controller then closes the fill valve 32 to stop the flow of fluid from the reservoir 12 into the fill tube 30, and opens the dispense valve 38 to dispense a predetermined volume of fluid from the fill tube 30 into the bottles or containers. The device 10 will continue dispensing the fluid until the sensor 34 detects the falling level of the fluid in the fill tube 30. Upon detecting the fluid, sensor 34 generates a signal to the controller, which in turn, generates the control signal to close the dispense valve 38 and cease dispensing the fluid.

Figure 3:
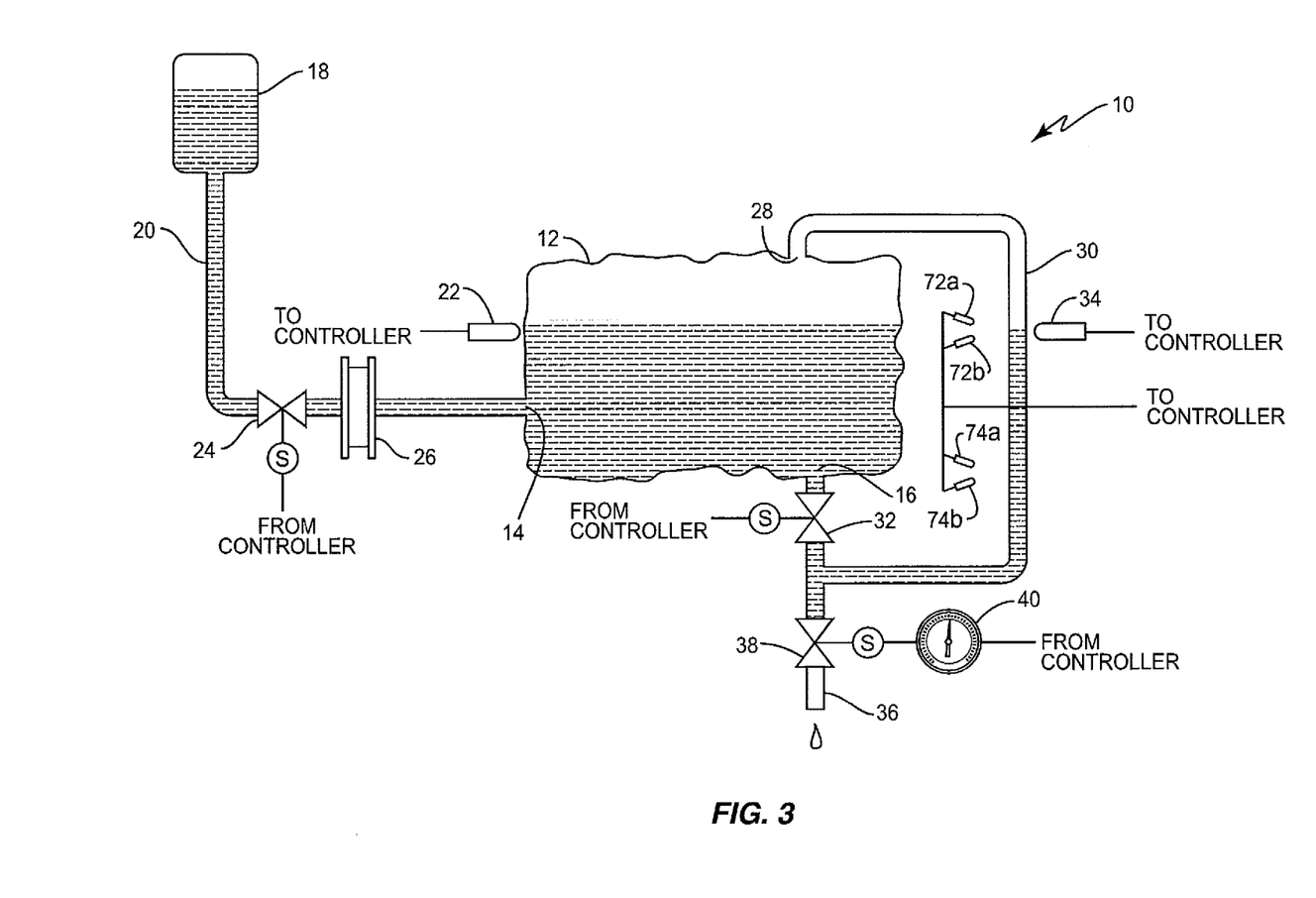
FIG. 3 is a block diagram illustrating a Time-Volumetric Fluid Dispensing Apparatus configured according to another embodiment of the present invention.

FIG. 3 illustrates another embodiment of device 10 that allows the opening and closing of valves 32 and 38 to be controlled more accurately during the filling and dispensing stages. Particularly, the components of device 10 in FIG. 3 function as previously described in the embodiment shown in FIG. 1. However, in addition to those components, device 10 in this embodiment further comprises first and second pairs of meniscus sensors 72a, 72b (collectively, 72) and 74a, 74b (collectively, 74). These sensors 72, 74 may be, for example, optical sensors and are operatively connected to the controller.

Conventionally, meniscus sensors were configured only to indicate whether the level of the fluid in a fill tube had passed beyond a predefined level. Thus, with conventional devices, the meniscus sensors could only indicate whether the bottles or containers were being filled to a minimum volume with the fluid. Meniscus sensors were not able to indicate in these devices whether the bottles or containers receiving the fluid might be overfilled. With conventional check-weigh devices, those bottles, if detected, may have simply been identified and removed from operations. However, for operations having precise filling requirements, such as pharmaceutical operations, for example, such uncertainty is unacceptable. Further, operations would have been negatively affected while the device was adjusted to dispense an appropriate volume of fluid. Thus, conventional devices are not efficient and may require corrective procedures from time-to-time that are very time consuming.

With the present invention, however, the sensors 72, 74 are configured to monitor the actual position of the meniscus' of the fluid in the fill tube 30 at its highest and lowest levels, and provide those signals to the controller. The controller, in turn, is then programmed to use the information from sensors 72 and/or 74 to verify the accuracy of each individual fill and, where necessary, to adjust the timer value utilized by timer 40. This increases or decreases the length of time that the fluid is being dispensed into a given bottle or container thereby eliminating the problems of conventional devices.

Particularly, the first pair of meniscus sensors 72 detects the meniscus level of the fluid when it reaches the position detected by sensor 34. Based on which sensor 72a, 72b detects the meniscus, the controller verifies the accuracy of the fill and alters the time value for the timer 40, thereby adjusting the length of time the dispense valve 38 remains open. For example, if both the upper and lower sensors 72a, 72b detect the rising meniscus level at the end of the fill stage, it would indicate that the fill tube 30 contains more than the predetermined volume of fluid and might be out of specification. In such cases, both sensors would generate a signal to the controller, which would then reject that particular fill and decrease the time for timer 40 by a corresponding value. As a result, the dispense valve 38 would close faster causing a lesser amount of fluid to be dispensed. If neither sensor 72a, 72b detected the meniscus at the end of the fill stage, it would indicate that the fill tube 30 contains less than the predetermined volume of fluid and is possibly out of specification. In such cases, neither sensor would generate a signal to the controller. In this case, the controller would reject that fill and delay generating closing the fill valve 32, thereby causing a greater amount of fluid to be dispensed. Of course, if only the lower sensor 72b and sensor 34 detected the fluid level, it would indicate that the fluid level within fill tube 30 is within tolerances. In such cases, the controller would refrain from adjusting the timer 40.

The lower sensors 74a, 74b perform a similar function. Specifically, as the fluid is dispensed into the bottles or containers, the meniscus sensors 74 detect the falling level of fluid in the fill tube 30. If both sensors 74a, 74b detect the fluid level at the end of the dispensing stage, it could indicate that too little fluid is being dispensed, and thus, too much fluid is being left in the fill tube 30. In response to the signals from sensors 74a, 74b, the controller would reject that fill and increase the time for timer 40 such that the dispense valve 38 would remain open longer resulting in more fluid being dispensed. If neither sensor 74a, 74b detects the meniscus level of the fluid in the fill tube 30 at the end of the dispense stage, it could indicate that too much fluid is being dispensed. The controller would therefore reject that fill and decrease the value for the timer 40, thereby shortening time for dispensing the fluid. If only the lower sensor 74b sees the meniscus level, but the upper sensor 74a does not, the controller would not increase or decrease the time for timer 40, as this would indicate that the appropriate amount of fluid is being dispensed.

It should be understood that the meniscus sensors 72, 74 may also be configured to generate signals that cause an increase and/or decrease in the value for the fill timer 70 seen in FIG. 2 rather than the dispense timer 40.

Figure 4A:
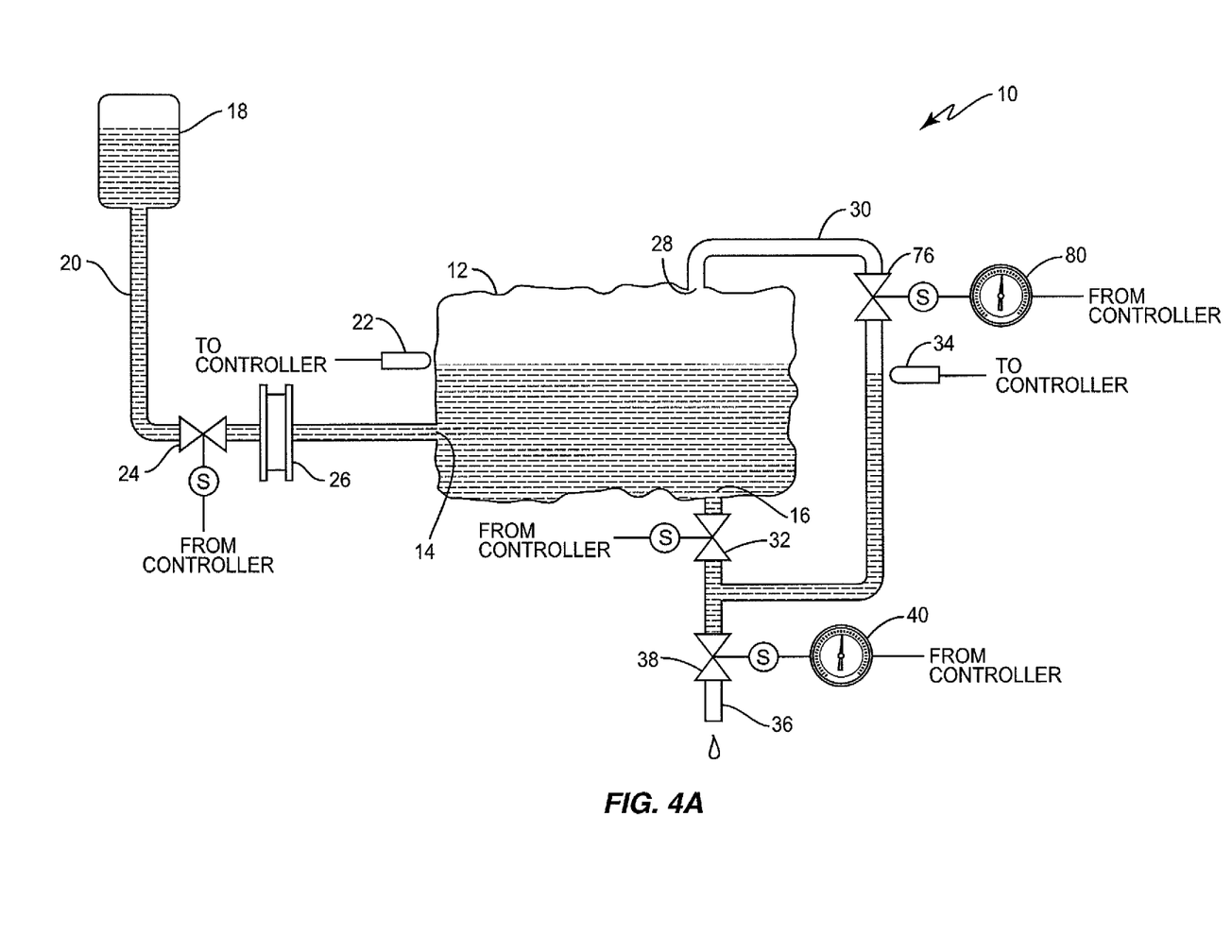
FIG. 4A is a block diagram illustrating a Time-Volumetric Fluid Dispensing Apparatus configured according to another embodiment of the present invention.

FIG. 4A is a block diagram that illustrates device 10 configured according to another embodiment of the present invention. As seen in FIG. 4A, the device 10 further comprises a control valve 76, a solenoid S, and a timer 80. Each is operatively connected to the programmable controller and cooperate with the fill and dispense valves 32, 38 to control the dispensing of fluid. The control valve 76 is disposed along a narrow, upper part of the fill tube 30, but is not in the fluid path. A mechanism, such as a tubing reducer (not shown) may be disposed proximate the control valve 76 to decrease the diameter of the fill tube 30. Decreasing the fill tube 30 diameter minimizes the energy required to close the control valve 76.

In this embodiment, the control valve 76 starts and stops the flow of fluid into and out of the fill tube 30 by creating a vacuum above the meniscus of the fluid at its highest level. Specifically, in the fill stage, the control valve opens to allow fluid from the reservoir 12 to fill the fill tube 30. The timer 80 determines the length of time that the control valve 76 remains open in the fill stage. When the timer 80 expires, the fluid is in the fill tube 30 and the control valve 76 closes. The control valve 76 will open once again in the dispensing stage to dispense the predetermined volume of fluid into the bottles or containers.

Figure 4B:
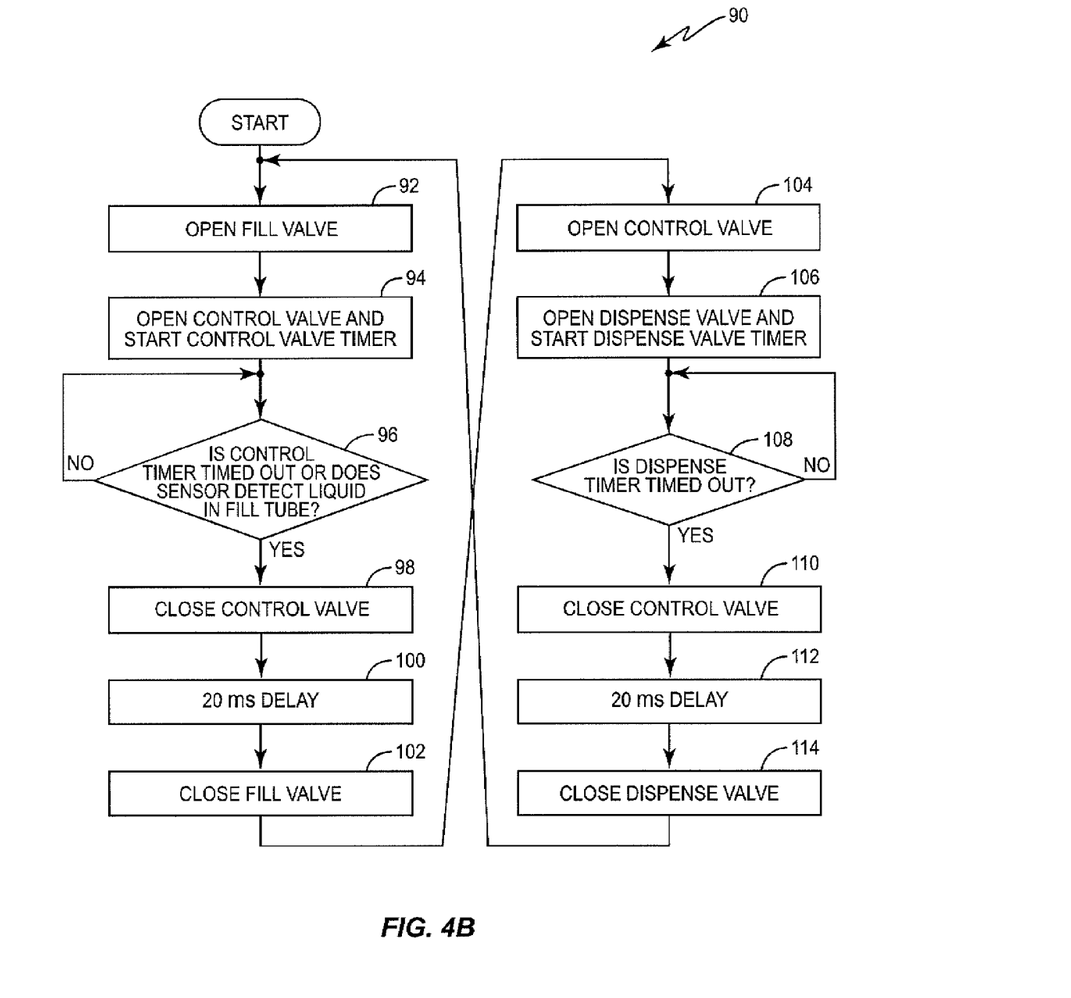
FIG. 4B is a flow chart illustrating a method by which the Time-Volumetric Fluid Dispensing Apparatus of FIG. 4A dispenses a predetermined volume of fluid according to one embodiment of the present invention.

FIG. 4B is a flow diagram illustrating a method 90 of dispensing a predetermined volume of fluid using a device 10 configured according to the embodiment seen in FIG. 4A. The method begins with the filling stage and the controller opens the fill valve 32 (box 92). Once open, the controller opens the control valve 76 and starts timer 80 (box 94). While the timer runs, the fill valve 32 allows fluid to enter the fill tube 30 from the reservoir 12. When the timer 80 expires, or alternatively, when the sensor 34 detects the rising level of fluid in fill tube 30 (box 96), the controller closes the control valve (box 98). Specifically, the timer 80 and/or the sensor 34 will generate a signal to the controller indicating that it should generate the requisite control signal to close the control valve 76. The controller will then enter a timed delay (box 100) before generating the control signal to close the fill valve 32 (box 102). The delay, which may be 20 ms, for example, ensures that the control valve 76 and the fill valve 32 are not closed at the same time.

In the dispensing stage, the controller will generate a control signal to open the control valve 76 (box 104). The controller will also generate the control signal(s) needed to open the dispense valve 38 and to start the dispense timer 40 (box 106). So long as the timer 40 is running and the valves 38, 76 are open (box 108), the fluid in the fill tube 30 will be dispensed through the dispense line 36 and into the bottles or containers. However, when the timer 40 expires (box 108), the controller will generate a control signal to close the control valve 76 (box 110). The controller will then wait for a small, predetermined delay (e.g., 20 ms) (box 112) before closing the dispense valve 38 (box 114). So closed, the device 10 returns to the filling stage (boxes 92-102) before repeating the dispensing stage (boxes 102-114).

In this previous embodiment, the sensor 34 is disposed at an upper portion of the fill tube 30. However, those skilled in the art will readily appreciate that this is not required. In other embodiments, sensor 34 may be disposed at a lower portion of fill tube 30. In such cases, as seen in FIG. 2, for example, the fill timer 70 would be configured to time the fill stage as previously described.

Figure 5:
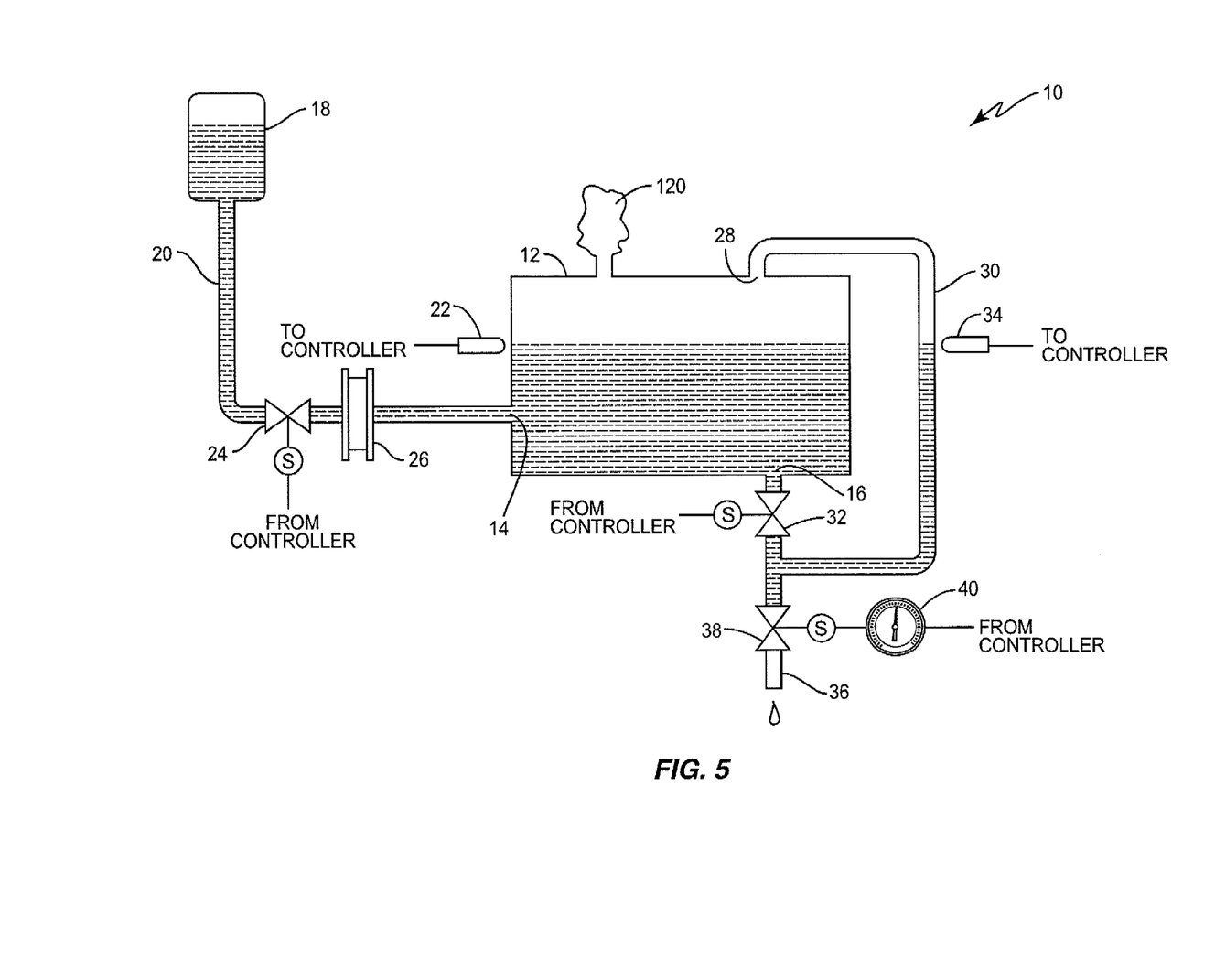
FIG. 5 is a block diagram illustrating a Time-Volumetric Fluid Dispensing Apparatus configured according to another embodiment of the present invention.

FIG. 5 is a block diagram illustrating another embodiment of the present invention. Specifically, the previous embodiments illustrated the reservoir 12 as being a flexible reservoir that expands and contracts according to the volume of fluid within the reservoir 12. However, in this embodiment, the reservoir walls are rigid. A breather bladder 120 may be operatively connected to the reservoir to assist in regulating the pressure within the reservoir 12.

Figure 6:
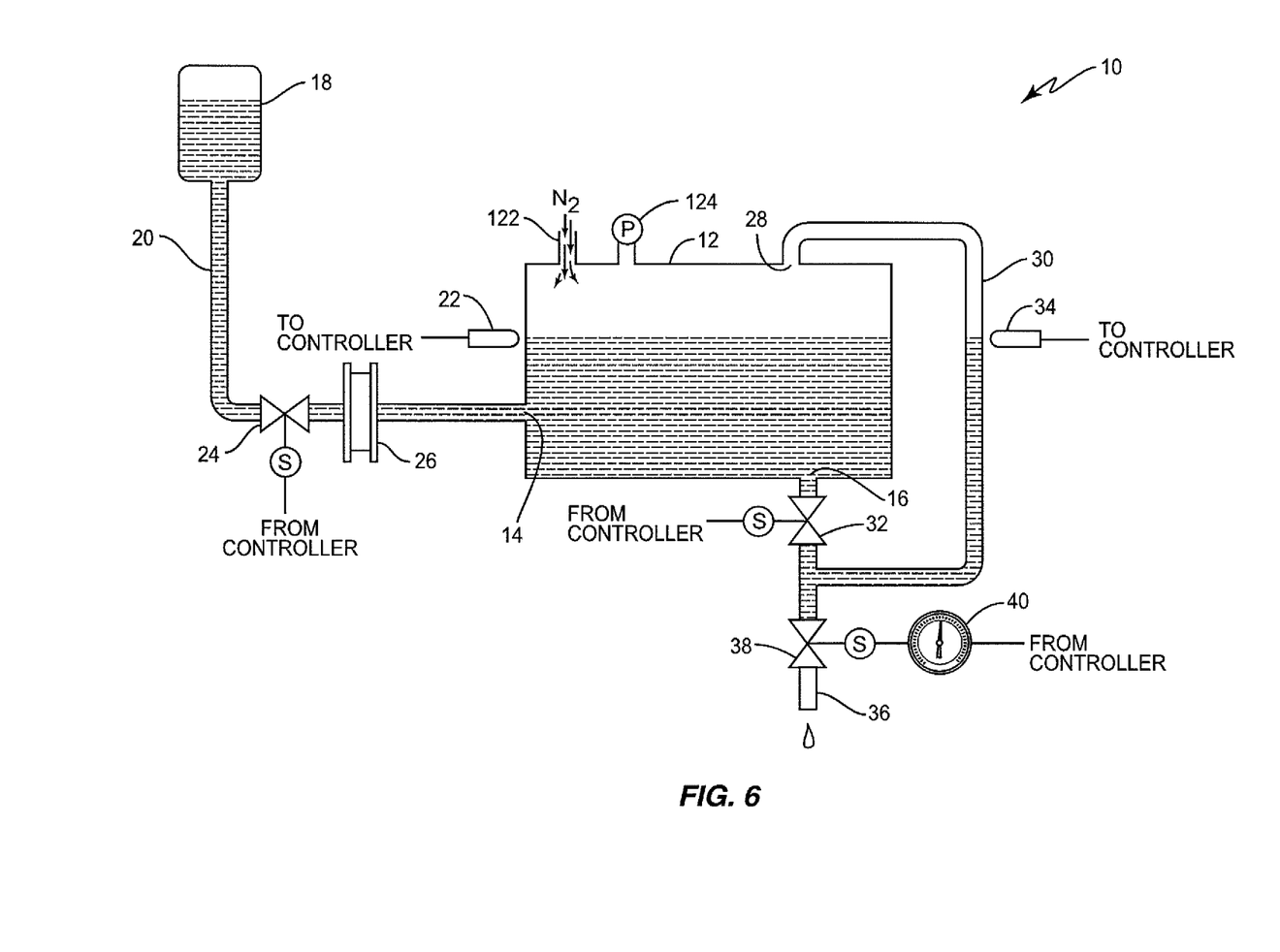
FIG. 6 is a block diagram illustrating a Time-Volumetric Fluid Dispensing Apparatus configured according to another embodiment of the present invention.

FIG. 6 is a block diagram illustrating another embodiment of a rigid-walled reservoir 12 having an inlet 122 to receive a gas from a gas supply and a pressure gauge 124 to measure the pressure within the reservoir 12. The gas may be, for example, nitrogen, and serves to pressurize the fluid within the reservoir 12. The pressure gauge measures the pressure so that an operator may adjust the amount of gas being forced into the reservoir as needed or desired. In this embodiment, the gas is used to maintain a substantially constant pressure within the reservoir 12.

Figure 7:
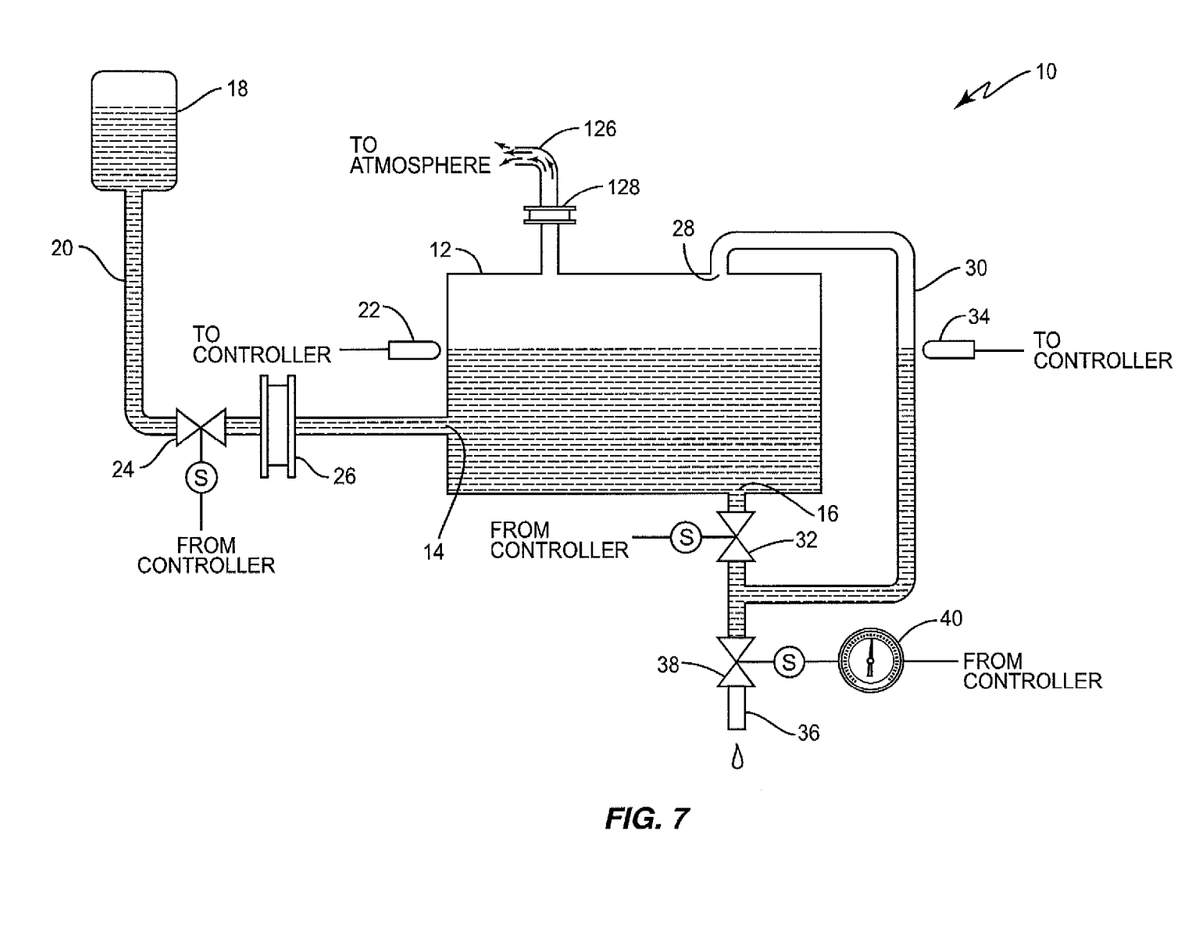
FIG. 7 is a block diagram illustrating a Time-Volumetric Fluid Dispensing Apparatus configured according to another embodiment of the present invention.

FIG. 7 is a block diagram illustrating the dispensing device 10 configured according to another embodiment of the present invention. In this embodiment, a vent 126 is provided that vents the interior of the reservoir 12 to the atmosphere through a filter 128. It should be understood that the vent 126 and/or the filter 128 may be used with a device 10 configured according to the embodiment of FIG. 6.

Figure 8:
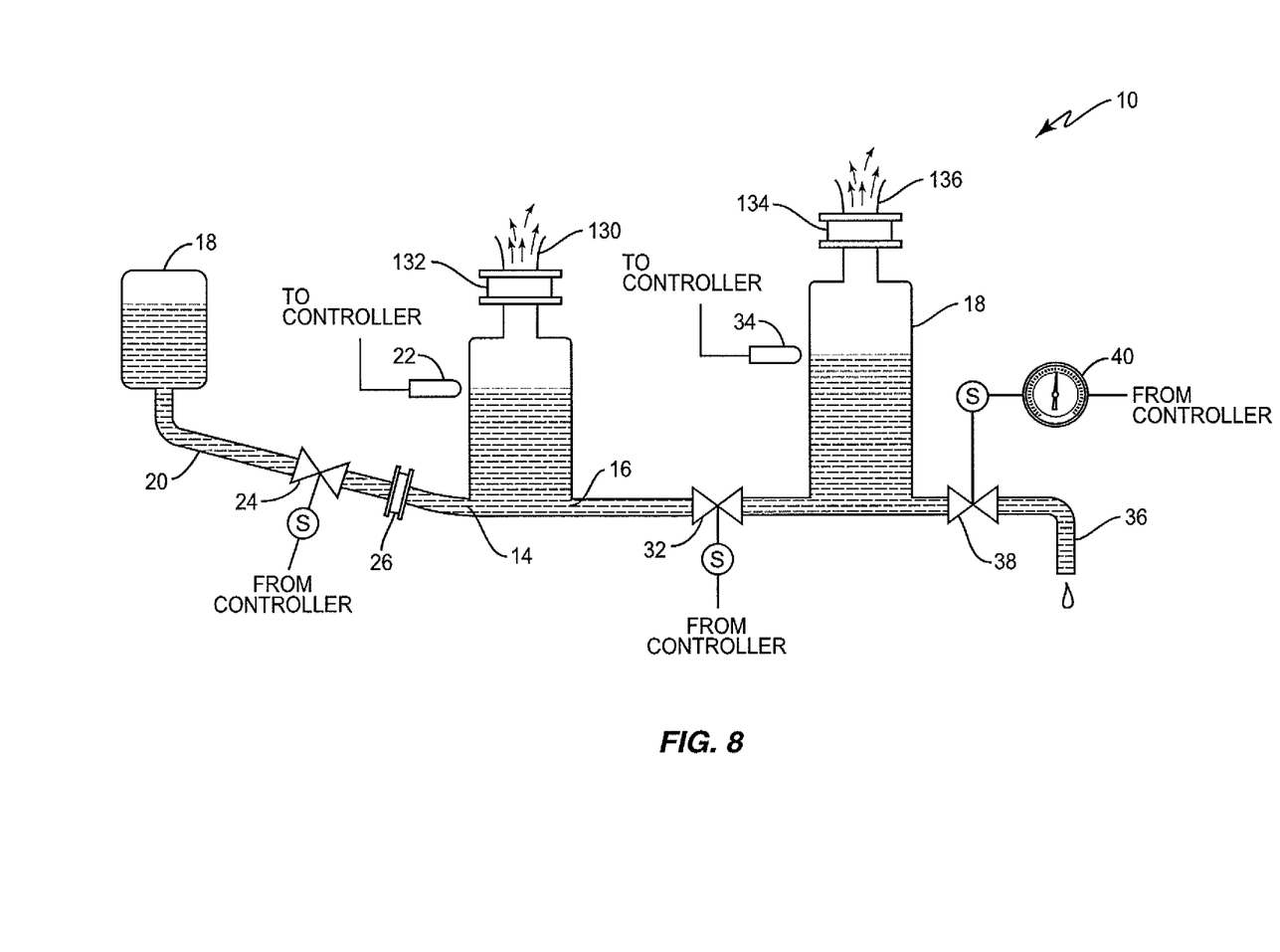
FIG. 8 is a block diagram illustrating a Time-Volumetric Fluid Dispensing Apparatus configured according to another embodiment of the present invention.

FIG. 8 is a block diagram illustrating the dispensing device 10 in a different configuration. In this embodiment, the device 10 is constructed so as to facilitate steam sterilization. Thus, both the reservoir 12 and the fill tube 30 are constructed to vent to the atmosphere via vents 130, 136 and filters 132, 134, respectively.

Figure 9:
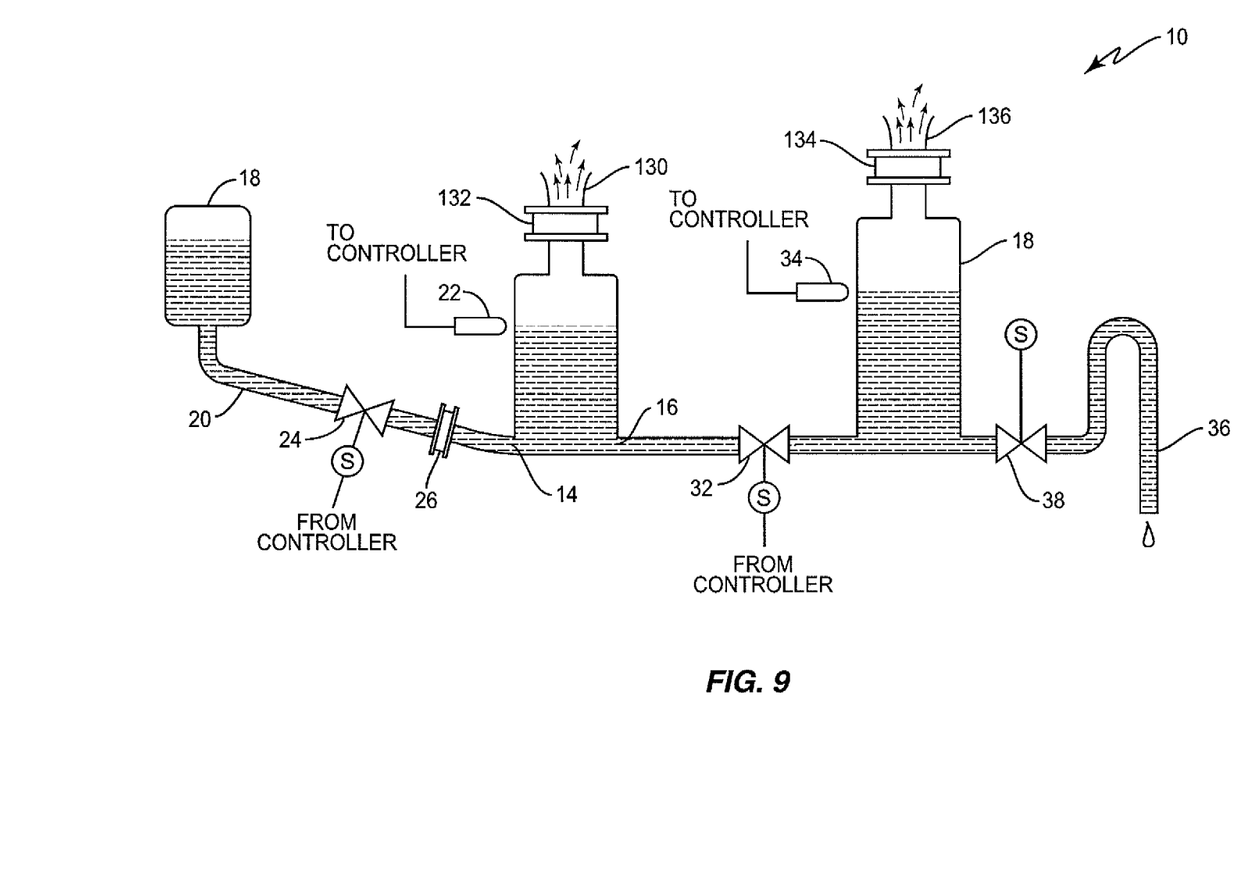
FIG. 9 is a block diagram illustrating a Time-Volumetric Fluid Dispensing Apparatus configured according to another embodiment of the present invention.

FIG. 9 is a block diagram illustrating a device 10 configured according to an embodiment that advantageously utilizes the Bernoulli principle to dispense a predetermined volume of fluid. In this embodiment, a portion of the dispense line 36 is kept higher than the highest meniscus level of the fluid in the fill tube 30 and lower than the sensor 22 for reservoir 12 to cause a siphon in the dispense line 36. The dispense line 36 may be connected to an elevator mechanism that raises or lowers the dispense line 36 as needed or desired.

The present invention may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein

What is claimed is:

1. A method for dispensing a predetermined volume of fluid into a fluid receptacle, the method comprising:
   supplying fluid from a fluid reservoir to a fill tube during a fill stage;
   discharging the fluid from the fill tube during a dispensing stage;
   detecting, with a fluid level sensor disposed proximate the fill tube, when the fluid level reaches a predetermined level during one of the fill stage and the dispensing stage; and
   measuring the predetermined volume of fluid by:
      measuring a time for supplying the fluid from the fluid reservoir to the fill tube starting from when the fluid level sensor detects that the fluid level in the fill tube is at the predetermined level; or
      measuring a time for discharging the fluid from the fill tube starting from when the fluid level sensor detects that the fluid level in the fill tube is at the predetermined level.

2. The method of claim 1 wherein supplying fluid from a fluid reservoir to a fill tube during the fill stage comprises:

opening a fill valve on the fill tube to fill the fill tube with a predetermined volume of fluid from the fluid reservoir; and closing the fill valve to stop the flow of fluid into the fill tube responsive to receiving a signal from the fluid level sensor.

3. The method of claim 2 wherein discharging the fluid from the fill tube during the dispensing stage comprises:

starting a timer to begin measuring the time for discharging the fluid from the fill tube;

opening a dispense valve on the fill tube to dispense the fluid from the fill tube; and closing the dispense valve to stop dispensing the fluid when the timer expires.

4. The method of claim 1 wherein supplying fluid from a fluid reservoir to a fill tube during the fill stage comprises:

starting a timer to begin measuring the time for supplying the fluid from the fluid reservoir to the fill tube;

opening a fill valve on the fill tube to fill the fill tube with a predetermined volume of fluid from the fluid reservoir; and closing the fill valve to stop the flow of fluid into the fill tube when the timer expires.

5. The method of claim 4 wherein discharging the fluid from the fill tube during the dispensing stage comprises:

opening a dispense valve on the fill tube to dispense the fluid from the fill tube; and closing the dispense valve to stop dispensing the fluid responsive to receiving a signal from the fluid level sensor.

6. The method of claim 1 wherein detecting, with a fluid level sensor disposed proximate the fill tube, when the fluid level reaches a predetermined level during one of the fill stage and the dispensing stage comprises:

detecting, using a first pair of meniscus sensors, whether a meniscus of the fluid in the fill tube rises to a level that is within a first predefined range during the fill stage; and detecting, using a second pair of meniscus sensors, whether the meniscus of the fluid in the fill tube falls to a level that is within a second predefined range during the dispensing stage.

7. The method of claim 6 further comprising increasing or decreasing a length of the timer responsive to receiving one or more error signals from one or more of the sensors in the first and second pairs of meniscus sensors.

8. The method of claim 1 further comprising opening and closing a control valve on the fill tube to selectively control supplying the fluid to the fill tube during the fill stage, and discharging the fluid from the fill tube during the dispensing stage.

9. The method of claim 8 wherein opening and closing the control valve on the fill tube to selectively control supplying the fluid to the fill tube during the fill stage comprises:

starting a control timer operatively connected to the control valve at the beginning of the fill stage;

opening the control valve to supply the fill tube with the fluid from the fluid reservoir when a fill valve on the fill tube is open; and closing the control valve to stop supplying the fill tube with the fluid when the control timer expires.

10. The method of claim 9 wherein opening and closing the control valve on the fill tube to selectively control discharging the fluid from the fill tube during the dispensing stage comprises:

opening the control valve to dispense the fluid into the receptacle when a discharge valve disposed on the fill tube is open; and closing the control valve to cease dispensing the fluid responsive to receiving a signal from a timer operatively connected to the dispense valve.

11. A fluid dispensing apparatus for dispensing a predetermined volume of fluid into a fluid receptacle, the dispensing apparatus comprising:

a fluid reservoir to hold a fluid to be dispensed;

a fill tube forming a closed-loop with the fluid reservoir to hold a predetermined volume of fluid to be dispensed into the fluid receptacle;

a fill valve disposed on the fill tube to supply fluid from the fluid reservoir to the fill tube during a fill stage;

a dispense valve disposed on the fill tube to dispense the fluid from the fill tube into the fluid receptacle during a dispense stage;

a fluid level sensor disposed proximate the fill tube and configured to detect a predetermined fluid level in the fill tube;

a timer; and a controller operatively connected to both the fluid level sensor and the timer, the controller configured to control the fill valve and the dispense valve, and to measure the predetermined volume of fluid by:

opening the fill valve and measuring a time for supplying the fluid from the fluid reservoir to the fill tube starting from when the fluid level sensor detects that the fluid level in the fill tube is at the predetermined level; or opening the dispense valve and measuring a time for discharging the fluid from the fill tube starting from when the fluid level sensor detects that the fluid level in the fill tube is at the predetermined level.

12. The fluid dispensing apparatus of claim 11 wherein the controller is further configured to:

open the fill valve to supply the fill tube with the predetermined volume of fluid from the fluid reservoir;

close the fill valve to stop supplying the fill tube with the fluid responsive to receiving a signal from the fluid level sensor;

start the timer;

open the dispense valve to dispense the predetermined volume of fluid from the fill tube into the receptacle; and close the dispense valve to stop dispensing the fluid when the timer expires.

13. The fluid dispensing apparatus of claim 11 wherein the controller is further configured to:

start the timer;

open the fill valve to fill the fill tube with the predetermined volume of fluid from the fluid reservoir;

close the fill valve to stop the flow of fluid into the fill tube when the timer expires;

open a dispense valve on the fill tube to dispense the predetermined volume of fluid from the fill tube into the receptacle; and close the dispense valve to stop dispensing the fluid responsive to receiving a signal from the fluid level sensor.

14. The fluid dispensing apparatus of claim 11 further comprising:

a first pair of meniscus sensors operatively connected to the controller to detect whether a meniscus of the fluid in the fill tube rises to a level that is within a first predefined range during the fill stage; and a second pair of meniscus sensors operatively connected to the controller to detect whether the meniscus of the fluid in the fill tube falls to a level that is within a second predefined range when the fluid is dispensed.

15. The fluid dispensing apparatus of claim 13 wherein the controller is configured to increase or decrease a length of the timer responsive to receiving one or more error signals from one or more of the sensors in the first and second pairs of meniscus sensors.

16. The fluid dispensing apparatus of claim 11 further comprising:
   a control valve disposed on the fill tube; and
   a control timer operatively connected to the control valve and the controller.

17. The fluid dispensing apparatus of claim 16 wherein the controller is further configured to:
   start the control timer at the beginning of the fill stage;
   open the control valve to supply the fill tube with the fluid from the fluid reservoir when the fill valve is open;
   close the control valve to cease supplying the fill tube with the fluid when the control timer expires;
   open the control valve to dispense the fluid into the receptacle when the discharge valve is open; and
   close the control valve to cease dispensing the fluid responsive to receiving a signal from the timer.

\* \* \* \* \*